United States Patent
King et al.

(10) Patent No.: US 8,386,779 B2
(45) Date of Patent: Feb. 26, 2013

(54) ROLE NAVIGATION DESIGNER AND VERIFIER

(75) Inventors: Nigel King, San Mateo, CA (US); Virginia Wolfe, Vashon, WA (US)

(73) Assignee: Oracle International Corporation, Redwood Shores, CA (US)

( * ) Notice: Subject to any disclaimer, the term of this patent is extended or adjusted under 35 U.S.C. 154(b) by 704 days.

(21) Appl. No.: 12/195,106

(22) Filed: Aug. 20, 2008

(65) Prior Publication Data

US 2010/0050252 A1 Feb. 25, 2010

(51) Int. Cl.
- H04L 29/06 (2006.01)
- H04L 9/32 (2006.01)
- G06F 7/04 (2006.01)
- G06F 17/30 (2006.01)
- G06F 15/16 (2006.01)
- G06F 15/173 (2006.01)

(52) U.S. Cl. ............. 713/167; 713/168; 726/4; 726/26; 709/218; 709/225

(58) Field of Classification Search .................. 713/167, 713/168; 726/4, 26; 709/218, 225
See application file for complete search history.

(56) References Cited

U.S. PATENT DOCUMENTS

| 5,920,861 A | 7/1999 | Hall et al. |
| 6,023,765 A | 2/2000 | Kuhn |
| 6,678,682 B1 | 1/2004 | Jenkins et al. |
| 2002/0178119 A1 | 11/2002 | Griffin et al. |
| 2003/0226103 A1* | 12/2003 | Hayer et al. ............... 715/501.1 |
| 2004/0059587 A1 | 3/2004 | Astle et al. |
| 2004/0205176 A1* | 10/2004 | Ting et al. .................... 709/223 |
| 2008/0077593 A1 | 3/2008 | Abrams et al. |
| 2008/0163286 A1* | 7/2008 | Rudolph et al. ................. 725/28 |
| 2008/0168048 A1* | 7/2008 | Bell et al. .......................... 707/5 |
| 2008/0183817 A1* | 7/2008 | Baek et al. .................... 709/204 |

OTHER PUBLICATIONS

Oracle® Containers for J2EE, Enterprise JavaBeans Developer's Guide, B28221-02, Mar. 2007, 520 pgs.

* cited by examiner

*Primary Examiner* — Aravind Moorthy
(74) *Attorney, Agent, or Firm* — Squire Sanders (US) LLP

(57) ABSTRACT

Systems and methods are provide for providing role navigation design and verification. An embodiment includes displaying user interface having at least one secured element, identifying a first privilege needed for access the secured element, and associating the privilege with a role, whereby a user having the role may access the at least one secured element.

15 Claims, 5 Drawing Sheets

ROLE NAVIGATION DESIGNER AND VERIFIER

FIELD OF THE INVENTION

One embodiment is directed generally to computer access, and more particularly to role and privilege managed computer access.

BACKGROUND INFORMATION

In a typical role-based access control ("RBAC") systems, access to an object within a computer system is provided to the members of groups termed "roles"; all subjects belonging to a given role have the same privileges to access various objects within the system. Individuals are then granted access to objects by being assigned membership in appropriate roles. RBAC is considered useful in many commercial environments because it allows access to the computer system to be conveniently organized along lines corresponding to the actual duties and responsibilities of individuals within organizations. For example, RBAC allows the access provided by roles to conform to a preexisting hierarchy; in a hospital environment, members of the "doctor" role will have broader access to protected objects than would members of "nurse", who will in turn be given broader access than "health-care provider". Various types of privilege can be conveniently organized as a function of role assignments. For example, "doctor" membership may allow the user the privilege to read from or write to a pharmacy record, while "pharmacist" may only allow the privilege of reading the record.

An advantage of RBAC is that it allows the access privileges provided to individuals to be very conveniently reconfigured as the individuals change job requirements, simply by deleting one's original assignment to a first role and adding one to the new role.

SUMMARY OF THE INVENTION

One embodiment is a method for providing role navigation design and verification. An embodiment includes displaying user interface having at least one secured element, identifying a first privilege needed for access the secured element, and associating the privilege with a role, whereby a user having the role may access the at least one secured element.

DETAILED DESCRIPTION

An embodiment is directed to a RBAC system manager that provides role design and verification for enterprise software applications based on navigation of a user interface. Permissions or privileges, i.e., the access rights to perform an action such as read, write, delete or execute, are granted to roles by selecting higher level navigation elements. For example, a system administrator might grant a role permission to view a particular intranet page by navigating to the page, selecting a role, and granting permission to view that page to the role.

Figure 1:
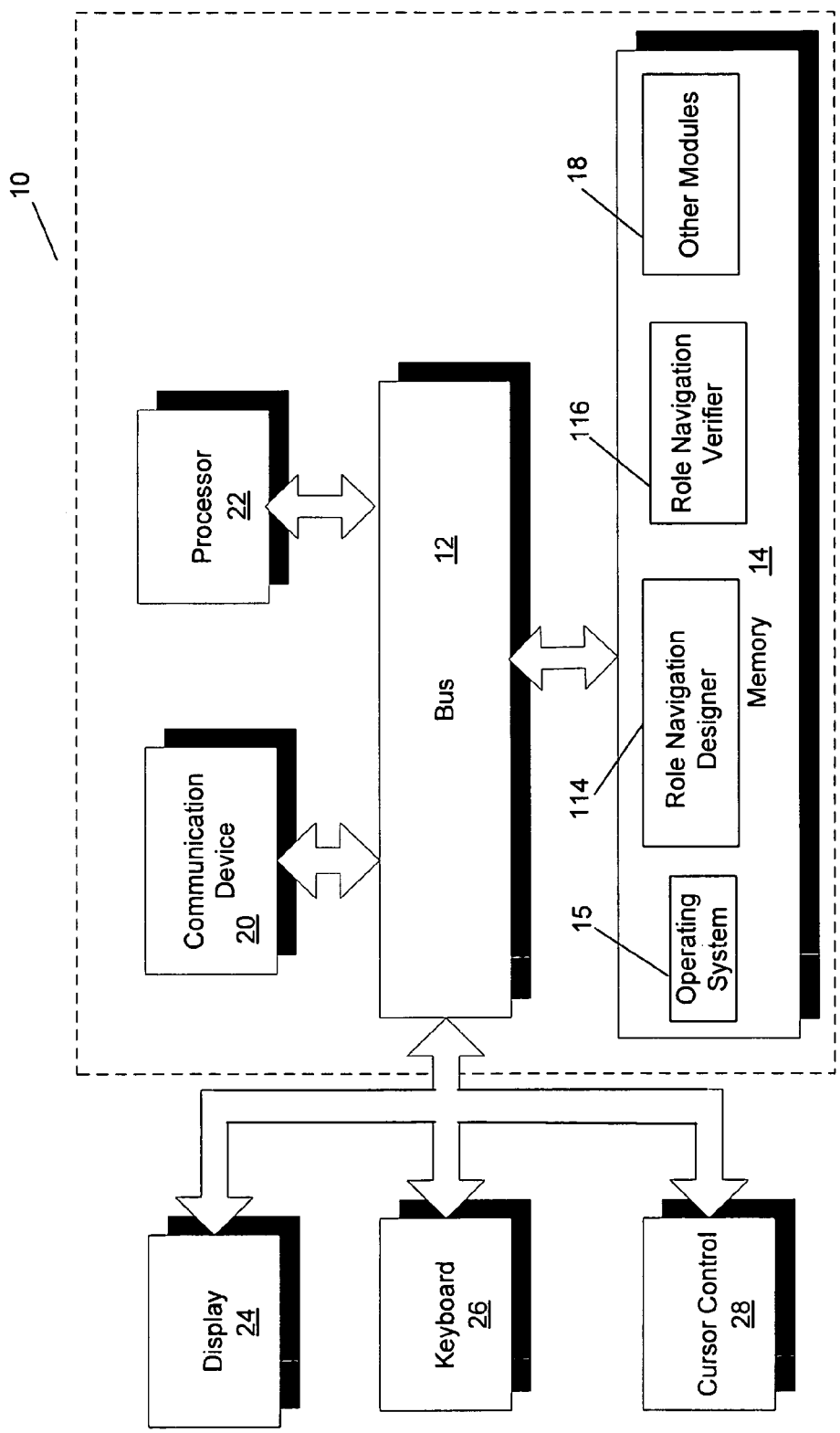
FIG. 1 is a block diagram of an role-based navigation manager in accordance with an embodiment.

FIG. 1 is a block diagram of a system 10 that can implement this embodiment. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a role navigation designer module 114 and a role navigation verifier module 116. These modules are described in greater detail below. Additional, fewer, and/or different modules 18 may also be included in system 10. In one embodiment role navigation designer module 114 and role navigation verifier module 116 are part of the "Oracle E-Business Suite Release 12" enterprise application system from Oracle Corp.

Figure 2:
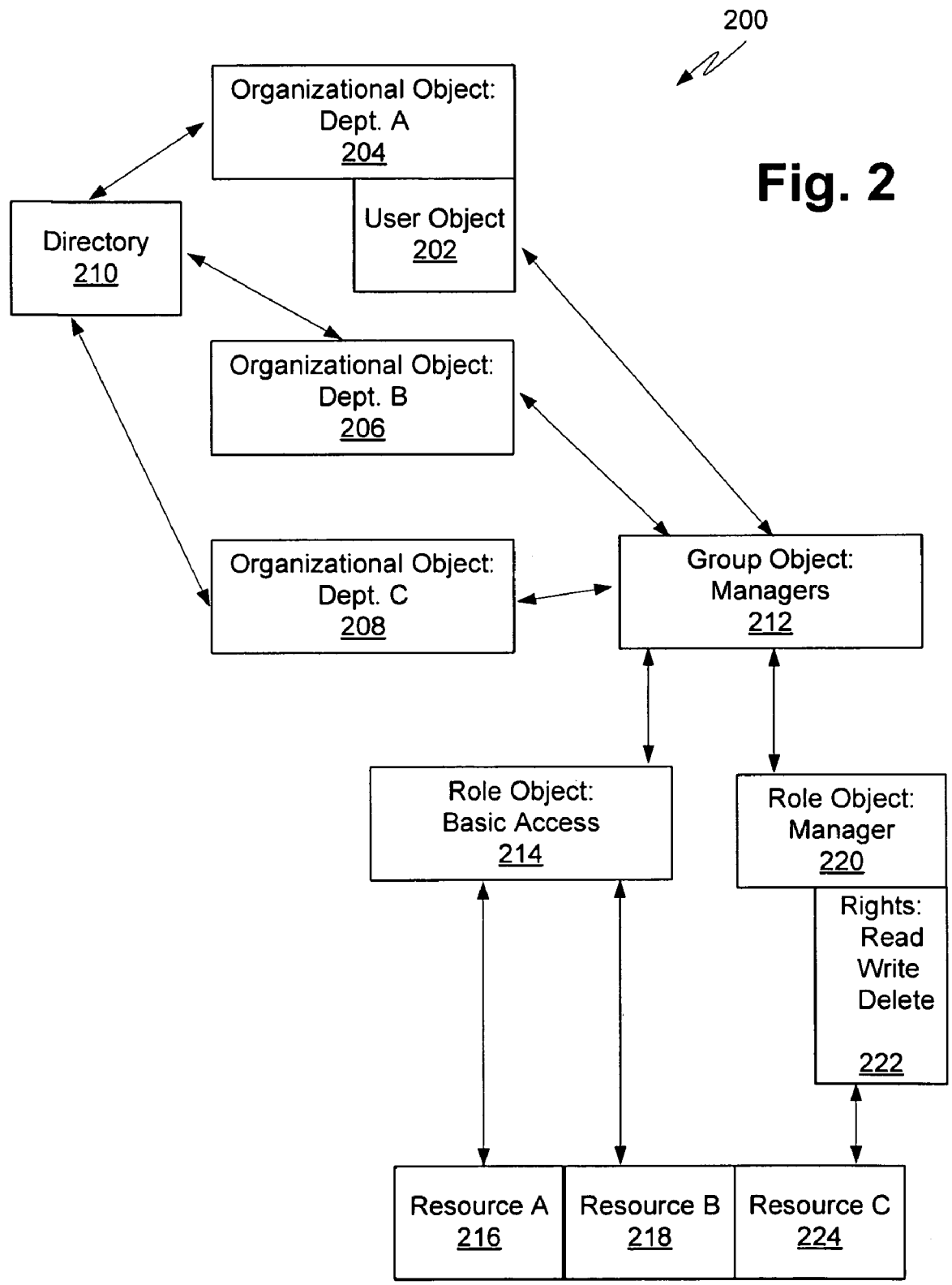
FIG. 2 is an example role-based access control system in accordance with an embodiment.

With reference now to FIG. 2, a block diagram depicts a typical role-based access control system. The elements shown within security management system 200 merely represent some of the general concepts, objects, relationships, or associations within a role-based access control system. Depending on the implementation of the security management system, the objects and relationships may have different names and functions.

Within an enterprise, an employee may "belong" to one or more organizational units, such as a department and a project. User object 202, which represents an employee, is associated with organizational object 204. Organizational objects 204-208 represent multiple organizational units within an enterprise, and each organizational unit is assumed to have multiple employees or users, and information about those employees are stored within corporate directory 210, which may be implemented as a data directory supported by one or more directory services.

User object 202 represents not only an employee but also a manager, so user object 202 is associated with group object 212, which represents a group of similar managers. In FIG. 2, organizational unit objects 206 and 208 are shown as being associated with group object 212. It may be assumed that each organizational unit within the enterprise has a manager of the type represented by group object 212, although the specific employees within the organizations represented by objects 206 and 208 are not specifically identified in the diagram.

Depending on an employee's title or job description within the enterprise, an employee may be assigned one or more roles within the security management/administration system. Group object 212 is associated with role object 214, which defines a role having basic access rights to resources 216 and 218. For example, each employee of the enterprise may have access to certain types of basic computational resources, such as an intranet account for accessing an internal, enterprise-wide, Web site. This basic access is also applicable to each manager associated with group object 212, so group object 212 has been associated with role object 214; resource 216 might represent authorization to access a particular internal Web server, while resource 218 might represent authorization to access a firewall to the Internet.

However, each manager within the organization might require special privileges for accessing a invoice management application. In order to reflect actual business processes, role object 220 is defined and associated with group object 212, and role object 220 has a set of access rights 222 that determine exactly how any user associated with role object 220 can use resource 224, which might represent the invoice management application. The invoice management application may be used by different types of employees within the enterprise who have different authorized uses of the invoice management application. For example, a clerical employee may be allowed to view a purchase order in the invoice management application, but not to approve it, whereas a manager role would have permission to approve the purchase order.

As shown with respect to the description of FIG. 2 above, a security administrator may be burdened with manually (through an appropriate management application) relating resources to roles within a prior art security administration system. Furthermore, an error condition exists where a role has inconsistent privileges. For example, a user may be privileged to approve a purchase order but have no means to review the purchase order that they will approve. The task to approve a purchase order may be implemented as a button on the view purchase order page and a user may have privileges to approve a purchase order but not to view a purchase order. This condition exists because the assignment of privileges to roles is not done in the context of the navigation paths and user interfaces that allow the performance of tasks requiring those privileges.

Figure 3:
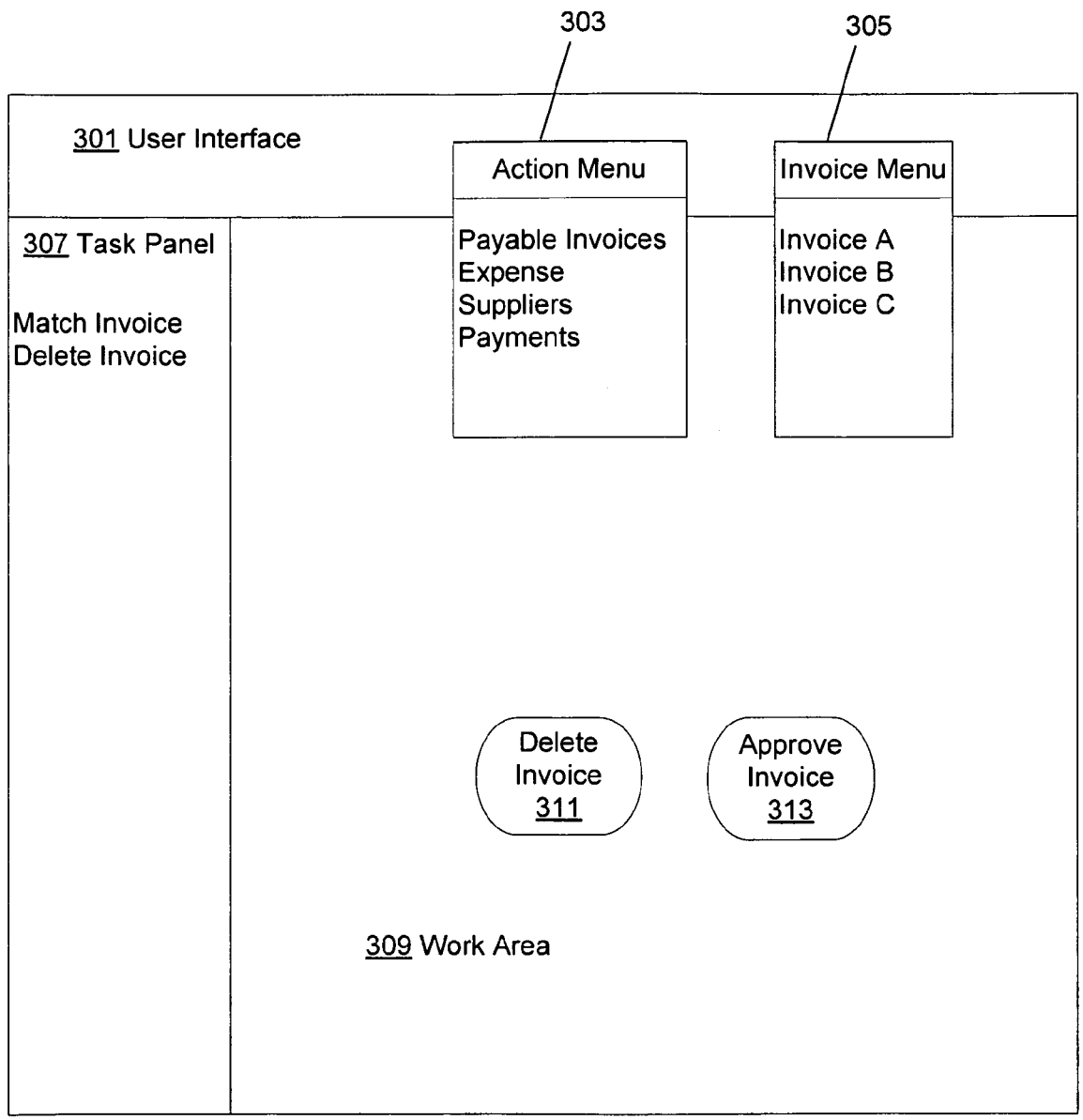
FIG. 3 is an example user interface in accordance with an embodiment.

An embodiment of role navigation designer 114 avoids this error condition by providing a user interface navigation-based model of role and privilege assignment. FIG. 3 illustrates an example user interface 301 where a system administrator may utilize role navigation designer 114 to grant permissions and privileges to roles. User interface 301 is, by way of example and not limitation, a user interface for an invoice application that includes a drop-down action menu 303, a drop-down invoices list 305, a task panel 307, and a work area 309. A user navigates user interface 301 by selecting an invoice from invoice list 305 and an action from action menu 303. For example, a user selects "Payable Invoices" from action menu 303, and tasks "Match Invoice" and "Delete Invoice" appear in task panel 307. When user selects "Delete Invoice" in task panel 307, "Delete Invoice" button 311 and "Approve Invoice" button 313 appear in work area 309. Buttons 311 and 313 may be securable targets that are, for example, visible but not actionable unless viewed by a role having the privilege to execute the securable targets. A securable target may be a resource such as a web page or page element (e.g., a tab, button, link, text box, etc.), or may be other computational resources such as a file, server, or firewall. Action menu 303 may also contain submenus. When navigating to a submenu, the menu taken to get to the submenu is referred to as a "parent menu."

Figure 4:
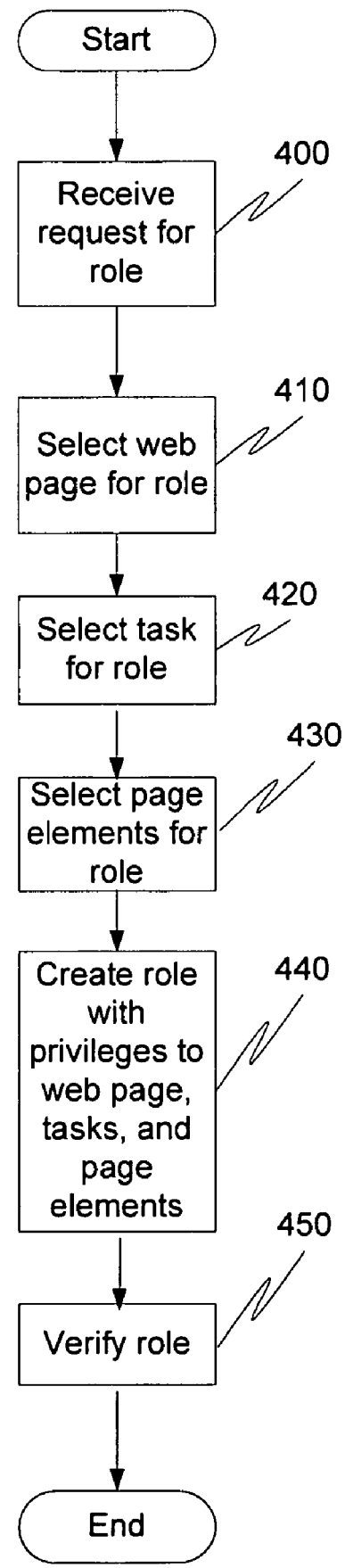
FIG. 4 is a flow diagram depicting a method for role navigation design in accordance with an embodiment.

FIG. 4 illustrates a flow diagram of the functionality of role navigation designer 114 in accordance with an embodiment when granting privileges to roles using a navigation path-based model. In one embodiment, the functionality of the flow diagram of FIG. 4 is implemented by software stored in memory and executed by a processor. In other embodiments, the functionality can be performed by hardware, or any combination of hardware and software. Explanation of the functionality is also done with reference to elements of FIG. 3. A security manager receives a request for a role including privileges that should be granted to the role (400). A role is a set of privileges for an abstract entity, and are created by naming the entity and assigning it privileges. For example, a financial manager may want the privileges to approve and delete invoices. To have these privileges, the financial manager needs access to the target (e.g., a resource such as a file, web page, or page element) that contains the capability to perform these actions. These privileges should be assigned to the "Financial Manager" role. The security manager navigates to a user interface, for example, user interface 301, using a menu to find a menu node pointing web page that includes the requested target (410). The security manager may also select specific tasks presented on the web page (420). For example, the security manager may select the "Delete Invoice" task in task panel 307 to give the Financial Manager role the privilege of deleting invoices. The security manager may also select specific securable page elements, such as a button (430). For example, the security manager may select the "Delete Invoice" button 311 and "Approve Invoice" button 313 in work area 309. Other securable elements may include menus, links, tasks, tabs, files, text boxes, check boxes, editable text, etc. Access to these securable elements is controlled by the RBAC system. Once the security manager is finished selecting the targets for the requested role (i.e., the menu pages, tasks, and individual securable page elements), the security manager creates a role with a list of privileges that grant access to those targets (440). After creating the role, the security manager may verify the navigability for the role using role navigation verifier 116.

Figure 5:
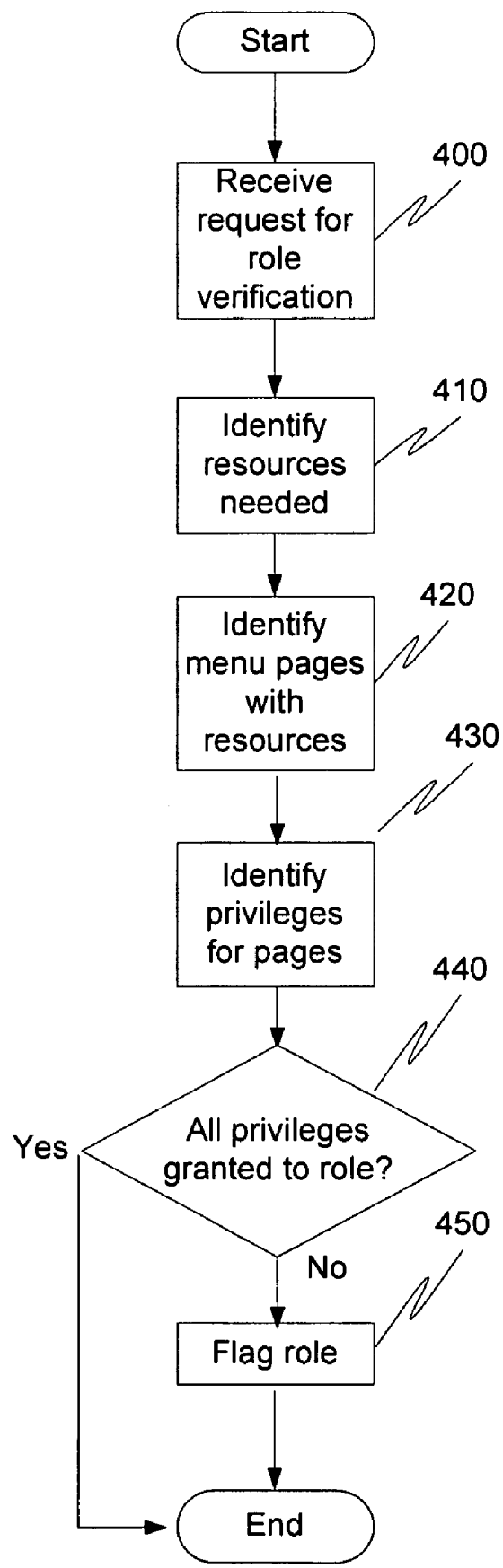
FIG. 5 is a flow diagram depicting a method for role navigation verification in accordance with an embodiment.

FIG. 5 illustrates a flow diagram of the functionality of role navigation verifier 116 in accordance with an embodiment when verifying that a role has access to use the privileges granted to it. In one embodiment, the functionality of the flow diagram of FIG. 5 is implemented by software stored in memory and executed by a processor. In other embodiments, the functionality can be performed by hardware, or any combination of hardware and software. Explanation of the functionality is also done with reference to elements of FIG. 3. The role navigation verifier 116 first receives a request to verify that the navigation paths are navigable for the privileges granted to the role (500). Role navigation verifier 116 then finds the targets associated with the privileges granted to the role (510). For example, the "Delete Invoice" button 311 is associated with the privilege of deleting invoices granted to a financial manager role. Role navigation verifier 116 then finds all menu nodes pointing to pages containing the targets (520). Role navigation verifier 116 then determines the privileges needed to reach the targets through the menu nodes starting with the root menu to the menu node pointing to the target. (530). For each privilege determined at 530, role navigation verifier 116 determines whether the privilege has been granted to the role (540). If a privilege determined at 530 is not granted to the role, the role is flagged as having an error condition (550). Otherwise the role navigation is verified and the process ends.

Accordingly, a security manager may create a role and assign privileges to that role, or alternatively add privileges to an existing role, by navigating to a target and provisioning the role with access rights to the target in the user interface. The target may be a web page itself or elements of the web page that may be individually secured. The target may also be a file, server, or other computing resource. Once created, the role may be verified by automatically determining the targets for which a role is privileged and automatically determining whether the role has other requisite privileges for navigating to those targets.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method, executed by a processor, for providing role navigation design, comprising:
   displaying, by the processor, a user interface having at least one secured target;
   providing navigation of the user interface, by the processor, starting with a root menu and proceeding to a menu node of the user interface that points to a web page that includes the at least one secured target, wherein a menu is used to find the web page that includes the at least one secured target;
   identifying, by the processor, a first privilege needed to access the secured target;
   identifying, by the processor, a second privilege needed to access at least one of a menu, submenu, or web page required to navigate to the secured target;
   selecting, by the processor, a role;
   associating, by the processor, the first privilege with the role, wherein a user having the role may access the at least one secured target; and
   associating, by the processor, the second privilege with the role, wherein the user having the role may access at least one of the menu, submenu, or web page required to navigate to the secured target;
   wherein the first privilege and the second privilege provide the user having the role a navigable path to the secured target.

2. The method of claim 1, further comprising identifying a third privilege to access a parent menu of the menu page and associating the third privilege with the role.

3. The method of claim 1, further comprising verifying the navigation path for the role.

4. The method of claim 1, wherein the secured target is a link.

5. The method of claim 1, wherein the secured target is a button.

6. The method of claim 1, wherein the secured target is a menu node.

7. The method of claim 1, wherein the secured target is a task.

8. A non-transitory computer-readable medium having instructions stored thereon that, when executed by a processor, cause the processor to provide role navigation verification for a role, the providing comprising:
   identifying a target for the role;
   identifying a menu node of a user interface that points to a web page containing the target;
   identifying at least two privileges needed to access the target through one or more menu nodes of the user interface starting with a root menu and proceeding to the menu node of the user interface that points to the web page containing the target, wherein at least one privilege is needed to access the target, and at least one other privilege is needed to access at least one of a menu, submenu, or web page required to navigate to the target;
   determining whether the at least two privileges are associated with the role; and
   flagging the role as in error when at least one of the at least two privileges is not associated with the role;
   wherein the at least two privileges provide a user having the role a navigable path to the target.

9. The computer-readable medium of claim 8, wherein the target is a link.

10. The computer-readable medium of claim 8, wherein the target is a button.

11. The computer-readable medium of claim 8, wherein the target is a menu node.

12. The computer-readable medium of claim 8, wherein the target is a task.

13. A system for providing role navigation design and verification, comprising:
   a display for displaying a user interface having at least one secured target;
   a role navigation designer for providing navigation of the user interface, wherein a menu is used to find a web page that includes the at least one secured target, identifying a first privilege needed for accessing the secured target, identifying a second privilege needed to access at least one of a menu, submenu, or web page required to navigate to the secured target, selecting a role, associating the first privilege with the role, wherein a user having the role may access the at least one secured target, and associating the second privilege with the role, wherein a user having the role may access at least one of the menu, submenu, or web page required to navigate to the secured target;
   wherein the first privilege and the second privilege provide the user having the role a navigable path to the secured target; and
   a role navigation verifier for identifying at least two privileges needed to access the target through one or more menu nodes of the user interface starting with a root menu and proceeding to the menu node of the user interface that points to the web page containing the target, wherein at least one privilege is needed to access the target, and at least one other privilege is needed to access at least one of the menu, submenu, or web page required to navigate to the secured target, and determining whether the role has the at least two privileges including the first privilege needed to access the at least one secured target.

14. The system of claim 13, wherein the role navigation verifier generates a report indicating whether the role lacks one of the first privilege and at least one second privilege.

15. A system for providing role navigation verification, comprising:
   means for identifying a target for the role;
   means for identifying a menu node of a user interface that points to a web page containing the target;
   means for identifying at least two privileges needed to access the target through one or more menu nodes of the user interface starting with a root menu and proceeding to the menu node of the user interface that points to the web page containing the target, wherein at least one privilege is needed to access the target, and at least one other privilege is needed to access at least one of a menu, submenu, or web page required to navigate to the target;

means for determining whether the at least two privileges are associated with the role; and means for flagging the role as in error when at least one of the at least two privileges is not associated with the role;

wherein the at least two privileges provide a user having the role a navigable path to the target.

\* \* \* \* \*